United States Patent
Holzhey

(10) Patent No.: US 11,901,778 B2
(45) Date of Patent: Feb. 13, 2024

(54) METHOD FOR PRODUCING AN ELECTRIC MOTOR, AND APPARATUS

(71) Applicant: Bayerische Motoren Werke Aktiengesellschaft, Munich (DE)

(72) Inventor: Martin Holzhey, Mering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/282,679

(22) PCT Filed: Sep. 24, 2019

(86) PCT No.: PCT/EP2019/075586
§ 371 (c)(1),
(2) Date: Apr. 2, 2021

(87) PCT Pub. No.: WO2020/069902
PCT Pub. Date: Apr. 9, 2020

(65) Prior Publication Data
US 2021/0351677 A1 Nov. 11, 2021

(30) Foreign Application Priority Data
Oct. 5, 2018 (DE) .................... 10 2018 124 561.0

(51) Int. Cl.
*H02K 15/10* (2006.01)
*H02K 3/34* (2006.01)

(52) U.S. Cl.
CPC ............. *H02K 15/10* (2013.01); *H02K 3/345* (2013.01)

(58) Field of Classification Search
CPC ...... H02K 15/10; H02K 3/345; H02K 15/085; H02K 15/09; H02K 15/065–068
See application file for complete search history.

(56) References Cited

U.S. PATENT DOCUMENTS

| 6,609,289 B2 | 8/2003 | Naka et al. | |
| 2003/0127936 A1* | 7/2003 | Katou | H02K 15/10 |
| | | | 310/215 |

(Continued)

FOREIGN PATENT DOCUMENTS

| DE | 100 18 140 A1 | 11/2000 |
| DE | 103 61 670 A1 | 8/2005 |

(Continued)

OTHER PUBLICATIONS

PCT/EP2019/075586, International Search Report dated Nov. 13, 2019 (Three (3) pages).

(Continued)

*Primary Examiner* — Livius R. Cazan
(74) *Attorney, Agent, or Firm* — Crowell & Moring LLP

(57) ABSTRACT

A method for producing an electric motor having a coil includes providing a coil core where the coil core has a slot which extends in a longitudinal direction of the coil core. The method further includes introducing a slot insulation into the slot such that the slot insulation projects beyond the coil core in the longitudinal direction and forms a projection, introducing a conductor material layer by layer into the slot, and using a first layer of the conductor material to retain the slot insulation in a region of the projection during an introduction of a second layer of the conductor material into the slot.

5 Claims, 1 Drawing Sheet

(56) References Cited

U.S. PATENT DOCUMENTS

| | | |
|---|---|---|
| 2005/0146238 A1 | 7/2005 | Morikaku et al. |
| 2005/0218746 A1* | 10/2005 | Fukasaku ............. H02K 15/085 |
| | | 310/208 |
| 2011/0260572 A1 | 10/2011 | Hiraga et al. |
| 2020/0220438 A1* | 7/2020 | Ide ........................ H02K 3/345 |

FOREIGN PATENT DOCUMENTS

| | | |
|---|---|---|
| DE | 10 2011 017 586 A1 | 4/2012 |
| DE | 10 2014 208 077 A1 | 10/2015 |
| DE | 10 2017 123 670 A1 | 4/2019 |
| EP | 0 945 962 A1 | 9/1999 |
| EP | 1 324 461 A2 | 7/2003 |
| WO | WO 2015/055445 A2 | 4/2015 |
| WO | WO 2017/159875 A1 | 9/2017 |

OTHER PUBLICATIONS

German Search Report issued in German application No. 10 2018 124 561.0 dated Sep. 11, 2019, with Statement of Relevancy (Nine (9) pages).

* cited by examiner

METHOD FOR PRODUCING AN ELECTRIC MOTOR, AND APPARATUS

BACKGROUND AND SUMMARY OF THE INVENTION

The present invention relates to a method for producing an electric motor, and to an apparatus.

In order to insulate the slots of stators or rotors of electric machines, use is made of insulation materials which are placed into the slots. These are, for example, films made of a wide variety of materials. However, when the conductor elements are introduced or pulled into the stator or rotor, the problem may occur here of the sensitive slot insulations slipping. In particular in the case of electric motors having shaped bar technology, the effects of force during the introduction of the shaped bars into the slots may lead to displacement of the insulations. WO 2015/055445 A2 discloses in this connection an apparatus and a method that prevent an axial displacement of the slot insulations during the introduction of shaped bars. However, the proposed method and the apparatus are complex.

It is therefore an object of the present invention to specify a method for producing an electric motor, and an apparatus which permit the introduction of conductor elements, in particular of shaped bars, into coil cores of electric machines in a reliable and uncomplicated manner without the slot insulations, in particular the position thereof, being negatively affected in the process.

According to the invention, a method for producing an electric motor having at least one coil comprises the steps of:
providing a coil core, wherein the coil core has at least one slot which extends in a longitudinal direction of the coil core;
introducing slot insulation into the at least one slot in such a manner that the slot insulation projects beyond the coil core in the longitudinal direction and forms a projection;
introducing conductor material layer by layer into the at least one slot; and
using a first layer of conductor material to retain the slot insulation in the region of the projection during the introduction of at least one further layer or during the introduction of further conductor material.

The slot insulation can be realized in various shapes. According to one embodiment, the slot insulation has, for example, an 0 shape in cross section, wherein only the slot base is covered here. Alternatively, the slot insulation can have a B shape, as a result of which, for example, insulation can be brought about between two current-conducting conductors or conductor portions of different phases. Alternative shapes are likewise possible. A cross section of the slot insulation can for example also be open or closed, etc. The aforementioned projection of the slot insulation or of the insulation via the laminated core serves first of all in a technical respect in particular to maintain air and creepage distances. Expediently, the projection is provided at both ends of the coil core, wherein it should be noted at this juncture that the coil core is preferably a laminated core. The projection or conductor material already introduced into the slot is now advantageously used to fix or to retain the slot insulation axially during the introduction of (further) conductor material. This is made possible in particular by the fact that the conductor material is introduced coat by coat or step by step or in particular layer by layer. In other words, a "filling" of a slot cross section with conductor material takes place as it were sequentially, wherein the first layer (of conductor material) which is introduced, wherein the radial position thereof can be selected freely, is used for retaining or fixing the slot insulation.

According to a preferred embodiment, the method comprises the step of:
retaining the slot insulation by pressing the slot insulation against the first layer, or vice versa, in the region of the projection during the introduction of the at least one further layer.

In other words, a force fit between the slot insulation and the first layer or the conductor material introduced in a first or preceding step is produced in the region of the projection, wherein the force fit is configured in such a manner that the slot insulation is sufficiently fixed along the longitudinal axis, i.e., in other words, axially, so as not to be displaced during the introduction of further conductor material. Expediently, the first layer or the conductor material introduced in a first step is arranged with a form fit in the slot insulation. The form fit is now advantageously supplemented by the force fit, by application of a force, for example by pushing together or squeezing together the slot insulation in the region of the projection, to the first layer, the force fit securely retaining the slot insulation in the slot.

The slot or the at least one slot has a slot cross section, wherein the first layer of the material or the conductor material introduced in a first step fills a first cross-sectional region of the slot cross section. The method advantageously comprises the step of:
retaining the slot insulation during the introduction of the first layer by supporting the slot insulation on the end sides in the region of a second cross-sectional region which is provided for the arranging of the at least one further layer or of the further conductor material.

This step is distinguished in particular by its simplicity since the introduction of the conductor material layer by layer or sequentially brings about the possibility of supporting the slot insulation in a simple manner on the end sides or axially in the region that is not filled with conductor material in a first or previous step.

According to one embodiment, the method comprises the step of:
supporting the slot insulation over the full surface area or in regions in the region of the second cross-sectional region.

The method is therefore distinguished in particular by a high degree of flexibility since the axial support of the slot insulation during the introduction of the first layer does not have to be realized unnecessarily precisely. It merely has to be ensured that the support does not prevent the introducing or insertion of the first layer into the slot insulation.

According to one embodiment, the coil core has a multiplicity of slots, and wherein the method comprises the step of:
simultaneously introducing a first layer or first layers into the slots or into the multiplicity of slots.

According to a preferred embodiment, shaped bars are used as conductor material. The method advantageously comprises the step of:
shaping an annular or basket-shaped shaped bar layer to form a first layer or to form first layers.

A plurality of layers can thereby be introduced rapidly and reliably. Added to this is the fact that such an annular or basket-shaped shaped bar layer can be readily preassembled and, because of its inherent stability, can be readily handled.

According to one embodiment, the method comprises the step of:

retaining the slot insulation(s) during the introduction of the first layer by means of a disk-shaped or annular retaining element which overlaps the second cross-sectional region(s).

A retaining element of this type can advantageously be shaped extremely simply. It does not have to have a complicated geometry, but merely has to be configured so as to secure the slot insulation against axial displacement or slipping.

According to one embodiment, the method comprises the step of:

retaining the slot insulation or the slot insulations during the introduction of the first layer(s) by circumferentially introducing a force to the projection or the projections.

In other words, the projection is acted upon virtually transversely with respect to the longitudinal extent thereof with a force, for example even with a squeezing force, thus creating an alternative variant for retaining or fixing the slot insulation during the introduction of the first layer or during the introduction of conductor material in a first step.

According to one embodiment, the method comprises the step of:

introducing a support element into the projection.

Therefore, during the aforementioned circumferential or radial introduction of the force to the projection, the slot insulation can be prevented from being staved in or even destroyed. Advantageously, the support element which is fixed axially can as it were take on a similar function to the first layer of conductor elements. The support element is removed or the application of the force is stopped when the first layer on being introduced or pushed in passes into the region of the projection. According to one embodiment, use is made of a tool which has a multiplicity of support elements, and therefore all of the slot insulations can be "supported" simultaneously. The support element or the tool is fitted or introduced as it were opposite that side of the coil core on which the conductor elements are introduced.

According to a preferred embodiment, the coil core is formed by a rotor or a stator of an electric motor. This advantageously involves a method for producing an electric motor, and in particular the stator and/or rotor thereof. According to a preferred embodiment, a current-excited synchronous machine is involved which comprises two coils, namely in the stator and in the rotor. According to a preferred embodiment, the two coils are both produced by the method. However, the method can be used in principle for all electric machines which have slot insulations.

The invention is also directed toward an apparatus for carrying out the method according to the invention. The advantages and features mentioned in conjunction with the method apply analogously and correspondingly to the apparatus.

Further advantages and features emerge from the description below of an embodiment of the method with respect to the attached figures.

DETAILED DESCRIPTION OF THE DRAWINGS

Figure 1:
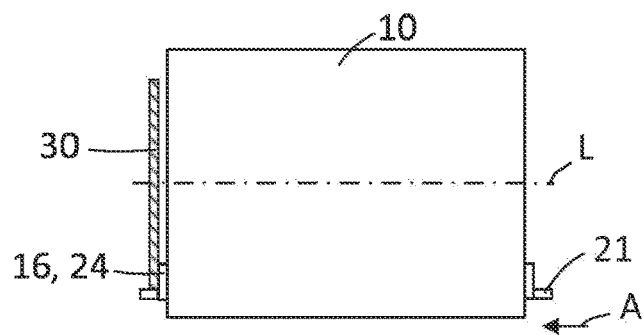
FIG. 1 shows a side view of a stator into which a first layer of a conductor element has been introduced.

FIG. 1 is a schematic illustration in a side view showing a coil core 10, wherein the coil core 10 illustrated here is, for example, a stator of an electric machine. The stator extends along a longitudinal axis or axis of rotation or stator axis L. Slot insulation 16 is introduced into the coil core 10, wherein a length of the slot insulation 16 is selected in such a manner that the slot insulation forms projections 24 defined on both end sides of the coil core 10. A first layer 21 of a conductor element is introduced in an arrangement direction A into the slot insulation 16 or into the slot, which cannot be seen, however, in the present diagram. In order to prevent displacement of the slot insulation 16 along the arrangement direction A during the introduction of the first layer 21, a retaining element 30, which can be designed, for example, as a simple disk, in particular circular disk, is advantageously arranged on the end side.

Figure 2:
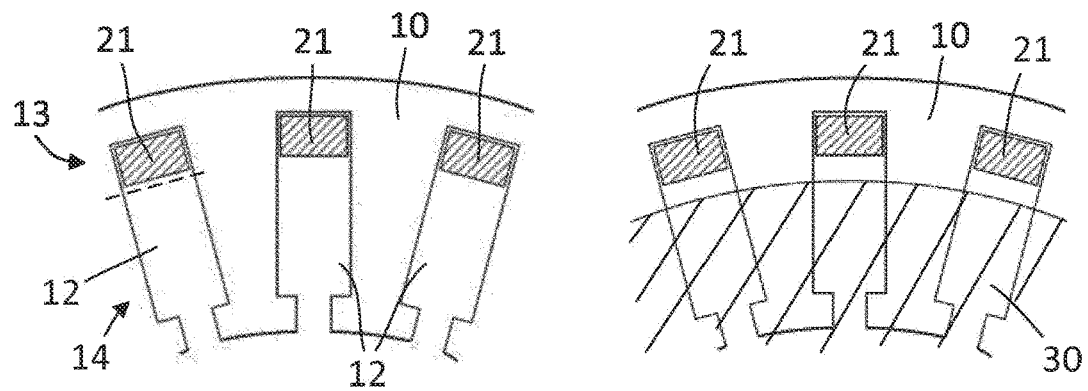
FIG. 2 shows a stator, as seen along the longitudinal axis thereof, and a retaining element, for retaining or fixing a plurality of slot insulations.

FIG. 2 shows in particular how a retaining element 30, which is already known from FIG. 1, is fitted for retaining the slot insulations during the introduction of first layers 21 of a conductor element. The two diagrams of FIG. 2 each show cutouts of a coil core 10, as seen in the longitudinal directions thereof, wherein in each case three grooves 12 can be seen. For space reasons, the longitudinal axis or axis of rotation is not illustrated further, but runs as it were perpendicularly to the plane of the drawing. It can be seen that the slot 12 or the slots 12 each has or have a slot cross section which, in the present case, is approximately rectangular, wherein a first layer 21 of a conductor element fills a first cross-sectional region 13 of the slot cross section and a second cross-sectional region 14 initially as it were remains "empty". The retaining element 30 is advantageously now arranged in the second cross-sectional region 14, as a result of which displacement of the slot insulations (not illustrated here) during the introduction of the first layers 21 is prevented. It can also be seen in the diagram shown here that the first layer 21 is in each case a shaped bar or what is referred to as a hairpin which has an approximately rectangular cross section. The slots extend here radially with respect to a longitudinal axis of the stator, but can also have different configurations and extend, for example, circumferentially. The first layer 21 also does not have to be arranged on the outside, but rather can be arranged at different locations, for example in particular on the inside, but also in the center of the slot. The crucial factor is for what is referred to as space to remain for the arrangement of a retaining element, wherein it can be seen in particular from the right-hand diagram of FIG. 2 that greater tolerances can be worked with throughout during the arrangement of the retaining element 30, which significantly facilitates the method.

Figure 3:
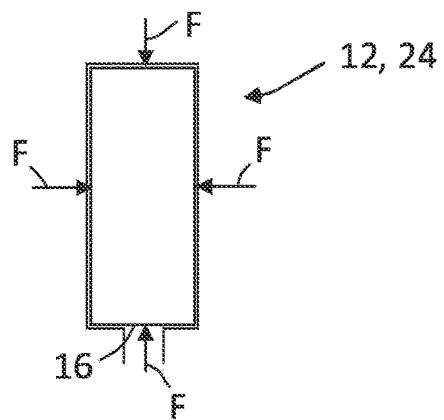
FIG. 3 shows a projection of slot insulation and one option for fixing same.

FIG. 3 shows an alternative configuration or method procedure for retaining a projection 24 of slot insulation 16 which is arranged in a slot 12. A longitudinal axis, not shown here, of a coil core or of the slot 12 likewise runs again transversely with respect to the plane of the drawing. A projection 24 of this type is achieved, for example, by circumferentially applying a force, as sketched for example by the force direction arrows F.

Figure 4:
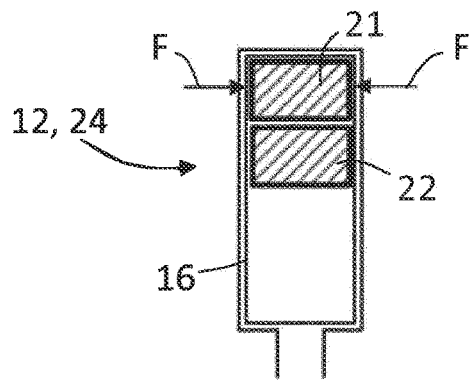
FIG. 4 shows the use of a first layer of a conductor element for retaining slot insulation during the introduction of further conductor elements.

FIG. 4 now shows how a first layer 21 is used for retaining slot insulation 16 in the region of a projection 24 during the introduction of at least one further layer 22 of a conductor element or of conductor material. This takes place for example by pressing together, as sketched by the force direction arrows F. Complicated apparatuses can thus be dispensed with since the conductor element or conductor material already located in the groove, cf. in particular reference sign 21, is advantageously used to secure the slot insulation 16 against slipping or being displaced during the introduction of the further conductor elements. A longitudinal axis, not illustrated here, of a coil core or of the slot 12 runs perpendicularly to the plane of the drawing.

LIST OF REFERENCE CHARACTERS

- 10 Coil core
- 12 Slot
- 13 First cross-sectional region
- 14 Second cross-sectional region
- 16 Slot insulation
- 21 First layer of a conductor element
- 22 Second layer of a conductor element
- 24 Projection
- 30 Retaining element
- L Longitudinal axis, axis of rotation, stator axis
- A Arrangement direction
- F Force direction arrow

What is claimed is:

1. A method for producing an electric motor having a coil, comprising the steps of:
   providing a coil core, wherein the coil core has a slot which extends in a longitudinal direction of the coil core;
   introducing a slot insulation into the slot such that the slot insulation projects beyond the coil core in the longitudinal direction and forms a projection;
   retaining the slot insulation in the slot by circumferentially introducing a squeezing force to the projection during introducing of a first layer of a conductor material into the slot;
   pressing the first layer of the conductor material and the slot insulation together by a force in a region of the projection such that a force-fit between the first layer of the conductor material and the slot insulation in the region of the projection is produced which force-fit fixes the slot insulation in the longitudinal direction; and
   during the step of pressing the first layer of the conductor material and the slot insulation together by the force in the region of the projection such that the force-fit between the first layer of the conductor material and the slot insulation in the region of the projection is produced, introducing a second layer of the conductor material into the slot.

2. The method according to claim 1, wherein the coil core has a plurality of slots;
   and further comprising the step of:
   simultaneously introducing respective first layers into the plurality of slots.

3. The method according to claim 1, wherein shaped bars are used as the conductor material;
   and further comprising the step of:
   shaping an annular or basket-shaped shaped bar layer to form the first layer.

4. The method according to claim 1 further comprising the step of introducing an axially fixed support element of a tool into the projection.

5. The method according to claim 1, wherein the coil core is formed by a rotor or a stator of the electric motor.

* * * * *